US007827332B2

(12) United States Patent
Kadota

(10) Patent No.: US 7,827,332 B2
(45) Date of Patent: Nov. 2, 2010

(54) PORTABLE STORAGE MEDIUM

(75) Inventor: Masatoshi Kadota, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 190 days.

(21) Appl. No.: 12/058,111

(22) Filed: Mar. 28, 2008

(65) Prior Publication Data

US 2008/0244106 A1 Oct. 2, 2008

(30) Foreign Application Priority Data

Mar. 30, 2007 (JP) ............................ 2007-091914

(51) Int. Cl.
*G06F 13/12* (2006.01)
*G06F 13/38* (2006.01)

(52) U.S. Cl. ........................................ 710/74; 358/523

(58) Field of Classification Search .................... 710/74
See application file for complete search history.

(56) References Cited

U.S. PATENT DOCUMENTS

| | | | | |
|---|---|---|---|---|
| 6,567,180 | B1 | 5/2003 | Kageyama et al. | |
| 6,606,669 | B1 | 8/2003 | Nakagiri | |
| 2003/0098988 | A1* | 5/2003 | Kim et al. | 358/1.13 |
| 2003/0212841 | A1* | 11/2003 | Lin | 710/62 |
| 2004/0088378 | A1* | 5/2004 | Moats | 709/219 |
| 2004/0184067 | A1* | 9/2004 | Suzuki | 358/1.15 |
| 2005/0068563 | A1* | 3/2005 | Nguyen et al. | 358/1.15 |
| 2005/0190399 | A1 | 9/2005 | Nakaoka et al. | |
| 2006/0123175 | A1* | 6/2006 | Yu et al. | 710/305 |

FOREIGN PATENT DOCUMENTS

| | | |
|---|---|---|
| JP | 06-274284 | 9/1994 |
| JP | 08-161250 | 6/1996 |
| JP | 10-340168 | 12/1998 |
| JP | 2000-311074 A | 11/2000 |
| JP | 2003-216353 A | 7/2003 |
| JP | 2004-096550 A | 3/2004 |
| JP | 2004-139249 | 5/2004 |
| JP | 2005-138531 | 6/2005 |
| JP | 2005-216019 | 8/2005 |
| JP | 2005-219225 | 8/2005 |
| JP | 2005-275483 A | 10/2005 |
| JP | 2006-178534 | 7/2006 |
| JP | 2006-209169 A | 8/2006 |
| JP | 2007-004398 A | 1/2007 |

OTHER PUBLICATIONS

JP Office Action dtd Apr. 21, 2009, JP Appln. 2007-091914.

* cited by examiner

*Primary Examiner*—Henry W Tsai
*Assistant Examiner*—Elias Mamo
(74) *Attorney, Agent, or Firm*—Banner & Witcoff, Ltd.

(57) ABSTRACT

A portable storage medium is provided with a connection unit which is connectable to an external device and enables data communication between the portable storage medium and the external device connected to the connection unit, a data storage unit which stores data received from the external device via the connection unit, and a data conversion unit capable of applying data conversion from print data into display data to the data stored in the data storage unit.

11 Claims, 11 Drawing Sheets

| | | | |
|---|---|---|---|
| USB INPUT/OUTPUT | | | ENDPOINT #0 (CONTROL TRANSFER) |
| | INTERFACE #1 | PRINTER CLASS | ENDPOINT #1 (BULK OUT) |
| | | | |

FIG. 4A

| | | | |
|---|---|---|---|
| USB INPUT/OUTPUT | | | ENDPOINT #0 (CONTROL TRANSFER) |
| | INTERFACE #2 | STORAGE CLASS | ENDPOINT #1 (BULK OUT) |
| | | | ENDPOINT #2 (BULK IN) |

FIG. 4B

| | | | |
|---|---|---|---|
| USB INPUT/OUTPUT | | | ENDPOINT #0 (CONTROL TRANSFER) |
| | INTERFACE #3 | STORAGE CLASS | |
| | | | ENDPOINT #1 (BULK IN) |

FIG. 4C

PORTABLE STORAGE MEDIUM

CROSS-REFERENCE TO RELATED APPLICATION

This application claims priority under 35 U.S.C. §119 from Japanese Patent Application No. 2007-091914 filed on Mar. 30, 2007. The entire subject matter of the application is incorporated herein by reference.

BACKGROUND

1. Technical Field

The present invention relates to a portable storage medium as a medium capable of storing data and being carried freely, and in particular, to a portable storage medium connectable to a personal computer's general-purpose port to which either a printer or a storage medium can be connected.

2. Related Art

Personal computers equipped with a connection unit (to which a portable storage medium such as a USB memory can be attached) configured as a general-purpose port (to which either a printer or a storage medium can be connected) have been proposed in recent years. There has also been proposed a printer having a similar connection unit (to which a USB memory can be attached) and being capable of automatically reading out print data from a USB memory and printing out the print data upon connection of the USB memory to the connection unit (the so-called "direct printing"). An example of such a configuration is described in Japanese Patent Provisional Publication No. 2005-138531.

For the direct printing from a portable storage medium (e.g. USB memory), at least data (e.g. file) to be used for the printing has to be stored in the portable storage medium prior to the connection to the printer. However, there are cases where not a file created by an application but print data generated by a printer driver (for the printer) has to be written to the portable storage medium prior to the connection. For such cases, there has been proposed a printer driver which realizes the writing of print data to a USB memory by displaying a dialog including a check box "OUTPUT AS FILE" on the computer screen, checking the status of the check box, and outputting the print data to the USB memory when the printing process is executed with the check box in the checked state. However, there are cases where the print data (e.g. PDL (Page Description Language) data) stored in the USB memory as above can not be displayed by a personal computer, etc. (to which the USB memory is attached) for the check of the print image.

On the other hand, in cases where the printer driver installed in a personal computer does not have the function of writing print data to a USB memory, display data (e.g. JPEG data) is written to the USB memory by the personal computer by the ordinary file storing process. In this case, a printer to which the USB memory is attached might be incapable of printing out the display data (e.g. JPEG data) directly (with no data conversion) depending on the specifications of the printer.

The present invention which has been made in consideration of the above problems is advantageous in that a portable storage medium, capable of realizing data sharing between a personal computer and a printer with ease, can be provided.

In accordance with an aspect of the present invention, there is provided a portable storage medium which is provided with a connection unit which is connectable to an external device and enables data communication between the portable storage medium and the external device connected to the connection unit, a data storage unit which stores data received from the external device via the connection unit and a data conversion unit capable of applying data conversion from print data into display data to the data stored in the data storage unit.

According the another aspect, there is provided a portable storage medium which is provided with a connection unit which is connectable to an external device and enables data communication between the portable storage medium and the external device connected to the connection unit, a data storage unit which stores data received from the external device via the connection unit and a data conversion unit capable of applying data conversion from display data into print data to the data stored in the data storage unit.

According to a further aspect of the invention, there is provided a portable storage medium which is provided with a connection unit which is connectable to external device and enables data communication between the portable storage medium and the external device connected to the connection unit, a data storage unit which stores data received from the external device via the connection unit, and a data conversion unit capable of applying data conversion from display data into print data and data conversion from print data into display data to the data stored in the data storage unit.

BRIEF DESCRIPTION OF THE ACCOMPANYING DRAWINGS

FIGS. 4A-4C are tables showing endpoint allocation of the USB memory;

DETAILED DESCRIPTION OF THE EMBODIMENTS

Figure 1:
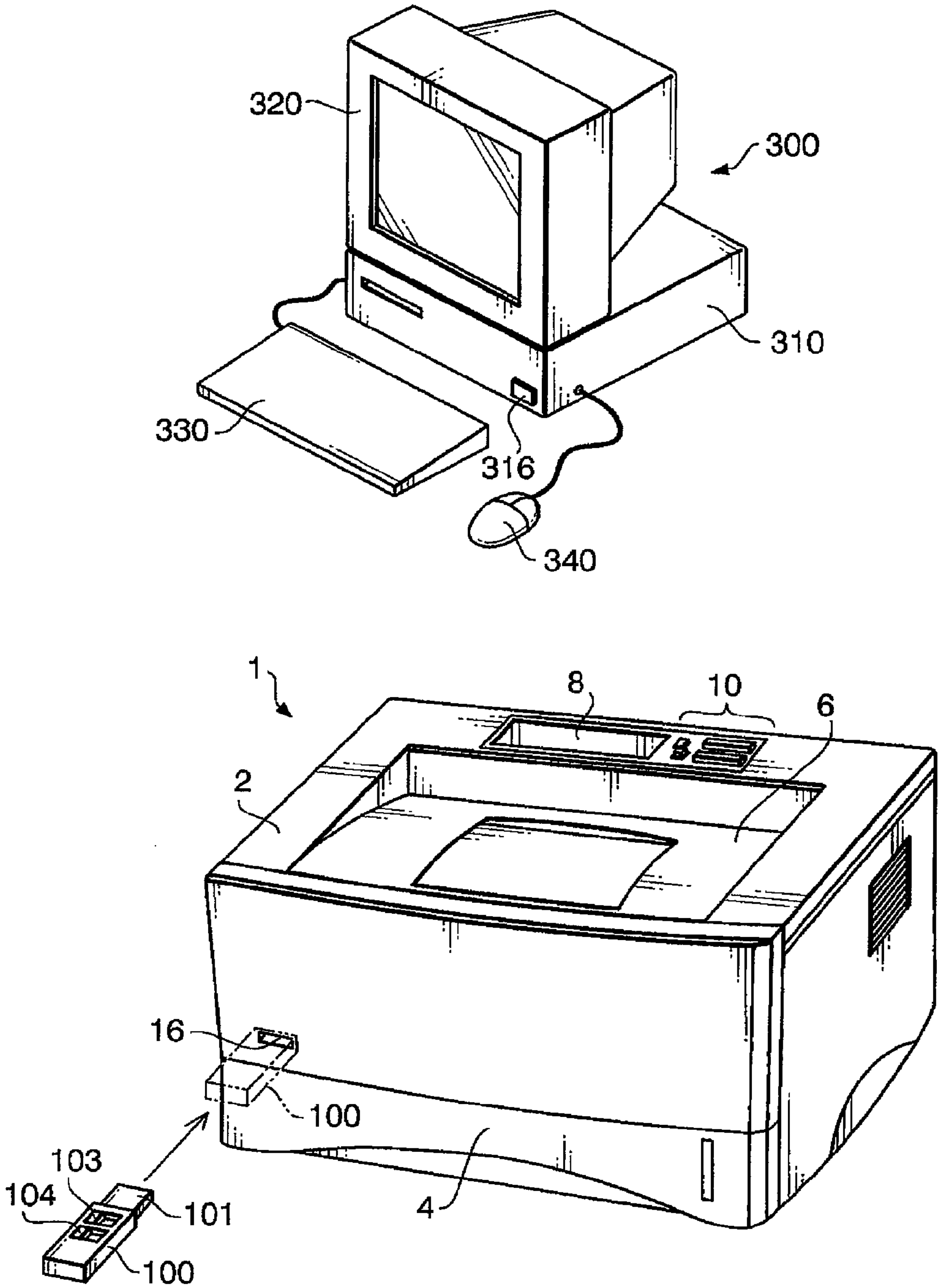
FIG. 1 is an external view showing the overall configuration of an image formation system in which a USB memory as an example of a portable storage medium in accordance with the present invention is used.

Referring now to the drawings, a description will be given in detail of preferred embodiments in accordance with the present invention.

FIG. 1 is an external view showing the overall configuration of an image formation system in which a USB memory 100 as an example of a portable storage medium in accordance with the present invention is used. The image formation system of FIG. 1 includes a printer 1 and a personal computer 300.

As shown in FIG. 1, a sheet feed cassette 4 for storing unshown print media (e.g. paper) is placed in the lower part of the body 2 of the printer 1 so that it can be inserted and withdrawn. An output tray part 6, for receiving and holding print media after undergoing the printing process, is formed oh the top of the body 2. The top of the body 2 is also provided with a display unit 8 (implemented by an LCD (Liquid crystal display), for example) for displaying information and an operation unit 10 for receiving various user operations (input operations) through various operation keys. The body 2 is also equipped with a slot 16 into which a USB memory 100 (as an example of a portable storage medium) can be inserted detachably.

Figure 2:
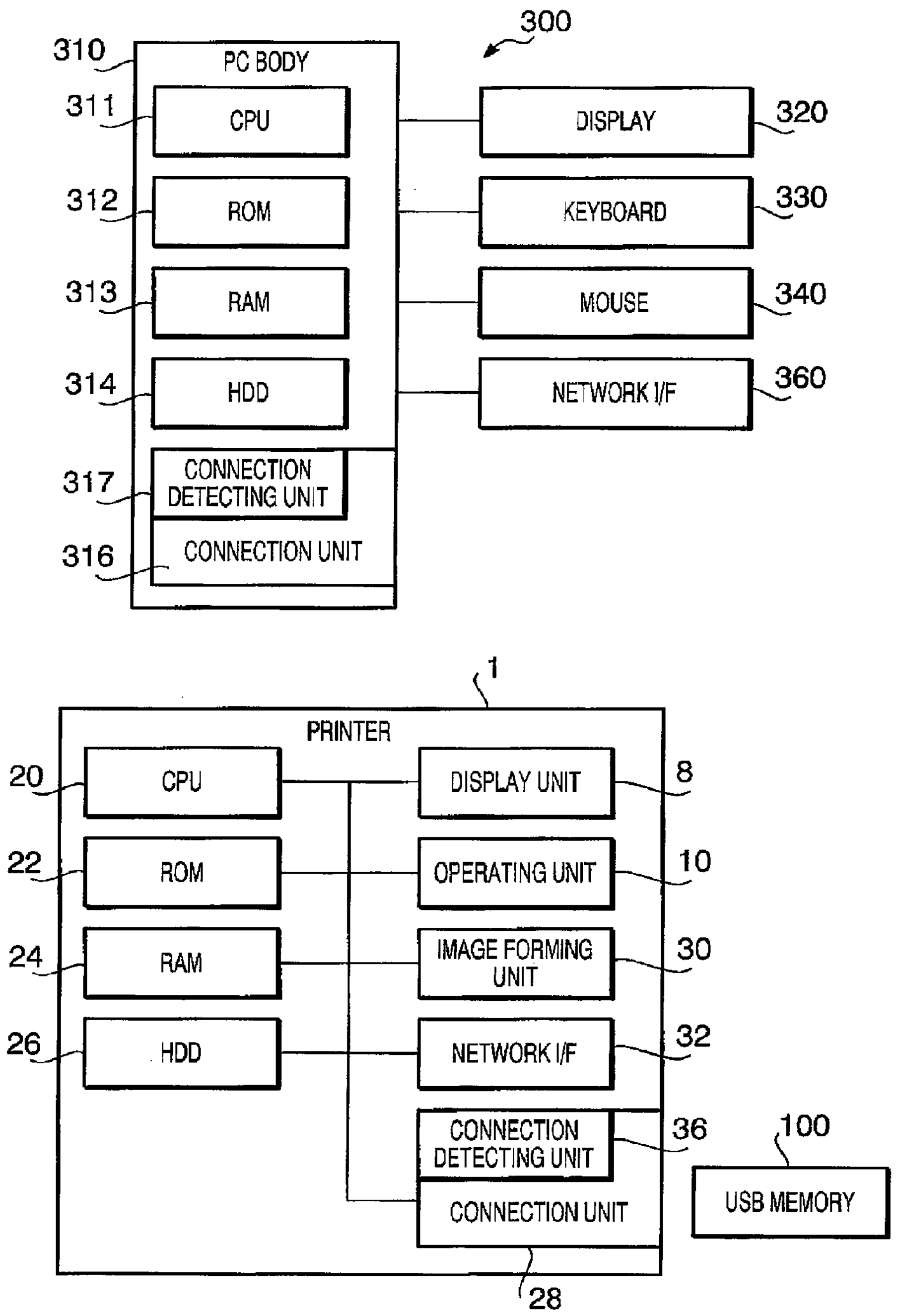
FIG. 2 is a block diagram showing the configuration of control systems of a personal computer and a printer included in the image formation system of FIG. 1.

FIG. 2 is a block diagram showing the configuration of control systems of the personal computer 300 and the printer 1 of the image formation system.

The printer 1 includes a CPU (Central Processing Unit) 20 for executing processing programs, a ROM (Read Only Memory) 22 storing the processing programs, etc., a RAM (Random Access Memory) 24 for temporarily storing results of processing, etc., an HDD (Hard Disk Drive) 26 for storing data, etc., a connection unit 28 to which the USB memory 100 inserted into the slot 16 is electrically connected, the aforementioned display unit 8, the aforementioned operation unit 10, an image formation unit 30 for executing the printing on print media under the control of a processing program, etc., and a network I/F (interface) 32 for the connection to an unshown network (LAN (Local Area Network), Internet, etc.). The connection unit 28 is equipped with a connection detecting unit 36 as a well-known unit for detecting whether a USB memory 100 has been attached to the slot 16 or not by monitoring a signal level of a terminal which stays in a conducting state (with a USB memory 100 attached to the slot 16) or in a non-conducting state (with no USB memory 100 attached to the slot 16).

The image formation unit 30 is configured to form a latent image on an unshown photosensitive drum by scanning a laser beam (modulated according to image data) on the photosensitive drum, form a toner image on the photosensitive drum by developing the latent image, transfer the toner image to a print medium fed from the sheet feed cassette 4, fix the transferred toner image, and eject the print medium with the fixed toner image to the output tray part 6. Incidentally, while the printer 1 in this embodiment is a page printer having the image formation unit 30 which forms a toner image on a photosensitive drum and transfers the toner image to a print medium as above, the type of the printer 1 is not particularly limited. For example, the printer 1 can also be an ink-jet serial printer.

The printer 1 forms the image data by expanding print data such as PDL (Page Description Language) data (stored in the USB memory 100) in a frame memory prepared in the RAM 24. The image data expanded in the frame memory of the RAM 24 is sent to the image formation unit 30 as CMYK data (K data in cases of gray-scale images) and thereby printed on a print medium such as paper. Incidentally, the printing process may either be color printing or monochrome printing.

Meanwhile, the main body 310 of the personal computer 300 (hereinafter referred to as a "PC body 310") includes a CPU 311, a ROM 312, a RAM 313 and an HDD 314, as well as a connection unit 316 (see FIG. 1) to which the USB memory 100 can be connected. The connection unit 316 of the personal computer 300 is also equipped with a connection detecting unit 317 for detecting whether a USB memory 100 has been attached to the connection unit 316 or not by monitoring a signal level of a terminal. Connected to the PC body 310 are a display 320, a keyboard 330, a mouse 340 (as well-known PC components, see FIG. 1) and a network I/F (interface) 360 for the connection to an unshown network (LAN, Internet, etc.).

Incidentally, the connection unit 316 of the personal computer 300 is a general-purpose port, to which the printer 1 can also be connected via a USB cable, etc. As shown in FIG. 1, the USB memory 100 of this embodiment is equipped with a well-known connection unit 101 (which can be connected to either the connection unit 28 of the printer 1 or the connection unit 316 of the personal computer 300) and two switches 103 and 104 which can be operated with a finger. The switch 103 can be set to three positions corresponding to "printer", "storage" and "driver storage" (hereinafter simply referred to as positions "printer", "storage" and "driver storage", ditto for other positions of switches described below). The switch 104 can be set to two positions "JEPG" and "PDL".

<Internal Configuration of USB Memory 100 of Embodiment 1>

Figure 3:
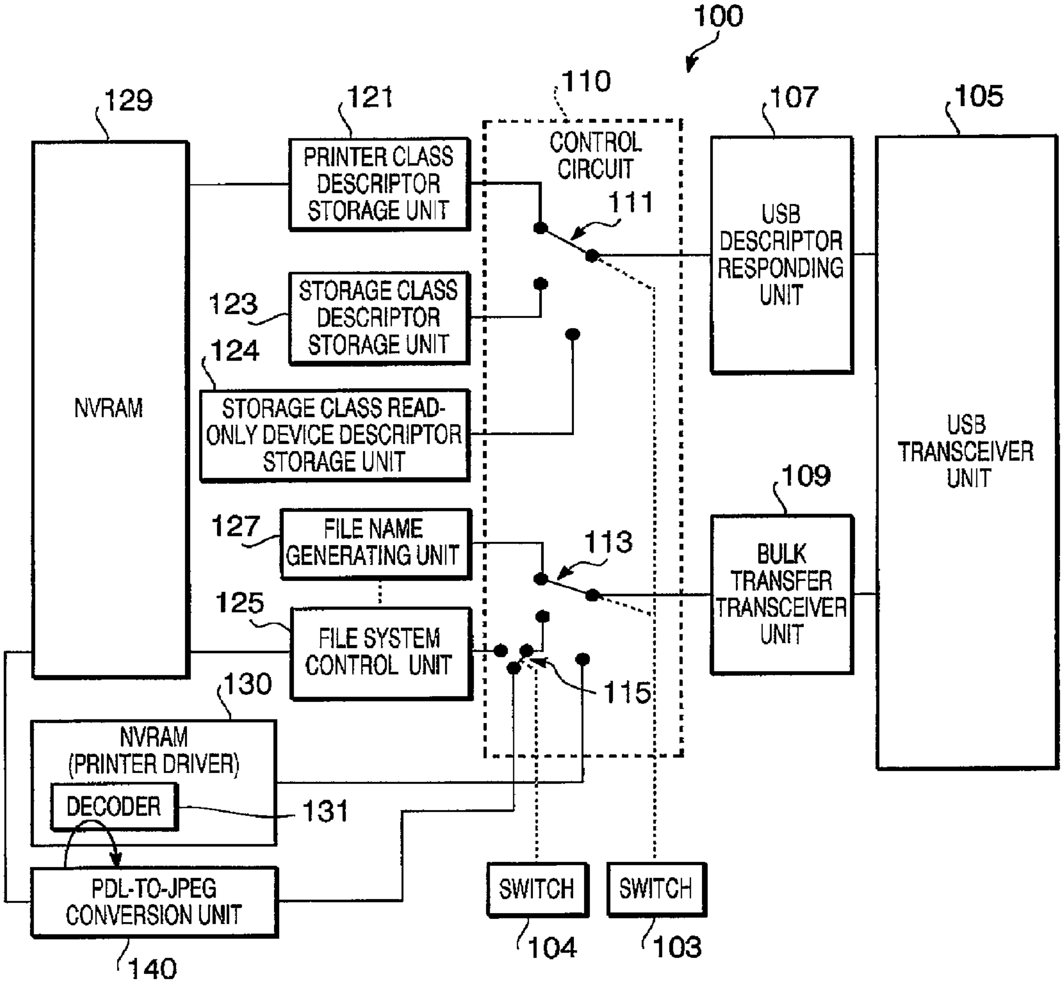
FIG. 3 is a block diagram showing a circuit configuration inside a USE memory in accordance with a first embodiment of the present invention.

FIG. 3 is a block diagram showing a circuit configuration inside the USB memory 100 in accordance with a first embodiment of the present invention. As shown in FIG. 3, the USB memory 100 includes a USB transceiver unit 105 for transmitting and receiving data via the connection unit 101 (see FIG. 1). Connected to the USB transceiver unit 105 are a USB descriptor responding unit 107 and a bulk transfer transceiver unit 109.

The USB descriptor responding unit 107 is selectively connected to a printer class descriptor storage unit 121, a storage class descriptor storage unit 123 or a storage class read-only device descriptor storage unit 124 via a contact point 111 of a control circuit 110. Meanwhile, the connection of the bulk transfer transceiver unit 109 (direct connection to a file system control unit 125, connection to the file system control unit 125 via a file name generating unit 127, or connection to an NVRAM (or ROM) 130) is switched by another contact point 113 of the control circuit 110.

The control circuit 110 (implemented by a logic circuit) switches the status of the contact points 111 and 113 (implemented by switching elements) based on the status of the switch 103, etc. The control circuit 110 includes still another contact point 115 placed between the contact point 113 and the file system control unit 125. The contact point 115 is switched depending on the status of the switch 104. By the switching of the contact point 115, whether data outputted by the file system control unit 125 (as will be described later) is fed through (processed by) a PDL-to-JPEG conversion unit 140 or not is switched.

The printer class descriptor storage unit 121, as a circuit storing a printer class descriptor, is connected to an NVRAM 129. Indefinite parts of the printer class descriptor (name, product ID, etc. of a printer for camouflage) have been stored in a part of the NVRAM 129. The printer class descriptor storage unit 121 generates a camouflaging printer class descriptor by combining a fixed part stored therein and the information (varying depending on the printer for camouflage) stored in the NVRAM 129. The storage class descriptor storage unit 123 is a circuit storing a storage class descriptor. The storage class read-only device descriptor storage unit 124 is a circuit storing a storage class read-only device descriptor. The file system control unit 125 is a circuit for controlling the file system of data written to or read from the NVRAM 129.

The NVRAM 130 stores printer driver software corresponding to the descriptor stored in the printer class descriptor storage unit 121. The printer driver software includes not only a program for the ordinary printer function but also a decoding routine which functions as a decoder 131. The PDL-to-JPEG conversion unit 140 (equipped with a CPU embedded in an LSI) has a function of converting PDL data into JPEG data by calling up the decoding routine as a subroutine. The NVRAM 130 further stores an installer, which is automatically started up at the first connection of the NVRAM 130.

In the USB memory 100 configured as above, endpoints are allocated as explained below by the switching of the contact points 111 and 113 by the control circuit 110.

When the switch 103 is set to the position "printer", control transfer is assigned to an endpoint #0 and printer class bulk out of an interface #1 is assigned to an endpoint #1 as shown in FIG. 4A.

When the switch 103 is set to the position "storage", control transfer is assigned to the endpoint #0, storage class bulk out of an interface #2 is assigned to the endpoint #1, and storage class bulk in of the interface #2 is assigned to an endpoint #2 as shown in FIG. 4B.

When the switch 103 is set to the position "driver storage", control transfer is assigned to the endpoint #0 and storage class bulk in of an interface #3 is assigned to the endpoint #1 as shown in FIG. 4C.

<Process and Effect of USB Memory 100>

Next, a process executed by the logic circuit centering around the control circuit 110 will be described. Incidentally, while the process executed inside the USB memory 100 is actually carried out as a hardware process as mentioned above, the process will be explained below by use of flow charts representing an equivalent process for the sake of convenience. It is of course possible to let the control circuit 110 execute the process as a software process by equipping the control circuit 110 with a CPU, etc.

Figure 5:
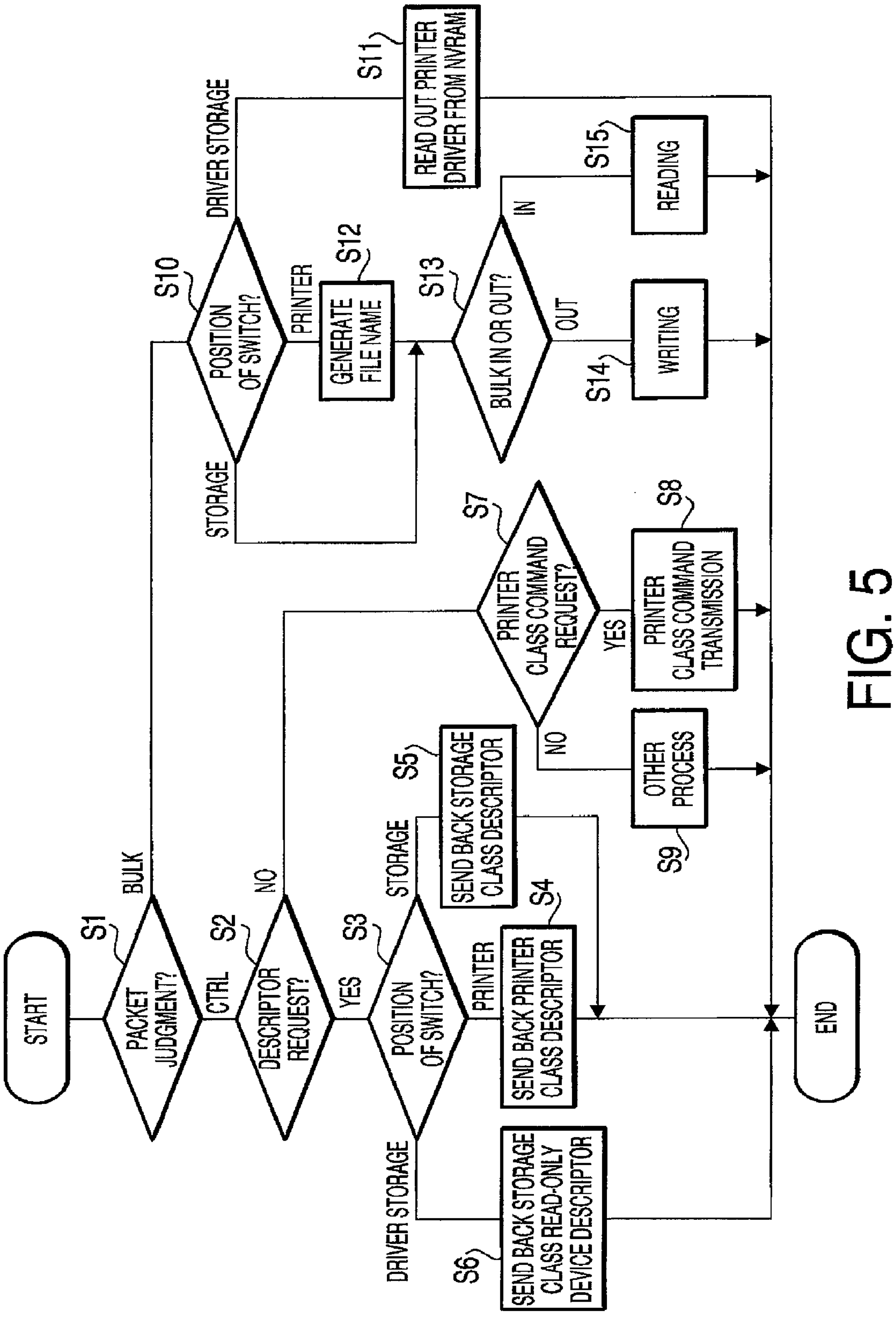
FIG. 5 is a flow chart showing a process executed by the USB memory (by expressing the process as a software process)

When the USB memory 100 is connected to the connection unit 316 of the personal computer 300, the CPU 311 of the personal computer 300 sends a packet requesting a variety of information to the USB memory 100. FIG. 5 is a flow chart corresponding to a process executed by the USB memory 100 upon reception of the packet.

At the start of the process of FIG. 5, the USB memory 100 judges whether the received packet is a packet of control transfer or that of bulk transfer (S1). Generally, upon detection of the connection of the USB memory 100 by the connection detecting unit 317, the personal computer 300 sends a request for a descriptor (descriptor request) to the USB memory 100 by means of control transfer in order to determine what has been connected to the connection unit 316.

When the received packet is a control transfer packet (S1: CTRL), the USB memory 100 judges whether the packet is a descriptor request or not (S2). When the packet is a descriptor request (S2: YES), the process branches as below depending on the status of the switch 103 (S3).

When the switch 103 is at the position "printer" (S3: PRINTER), the printer class descriptor is read out from the printer class descriptor storage unit 121 and sent back to the personal computer 300 as the response to the descriptor request (S4), by which the process of FIG. 5 is ended. In this case, the contact point 111 has been connected to the printer class descriptor storage unit 121 (see FIG. 3).

When the switch 103 is at the position "storage" (S3: STORAGE), the storage class descriptor is read out from the storage class descriptor storage unit 123 and sent back to the personal computer 300 as the response to the descriptor request (S5), by which the process of FIG. 5 is ended. In this case, the contact point 111 has been connected to the storage class descriptor storage unit 123 (see FIG. 3).

When the switch 103 is at the position "driver storage" (S3: DRIVER STORAGE), the storage class read-only device descriptor is read out from the storage class read-only device descriptor storage unit 124 and sent back to the personal computer 300 as the response to the descriptor request (S6), by which the process of FIG. 5 is ended. In this case, the contact point 111 has been connected to the storage class read-only device descriptor storage unit 124 (see FIG. 3).

Therefore, by previously setting the switch 103 at the position "printer" (S3: PRINTER), it is possible to make the personal computer 300 recognize the USB memory 100 as a printer by making the USB memory 100 send back the printer class descriptor to the personal computer 300 via the connection units 101 and 316 (S4). In this case, the printer driver of the personal computer 300 is allowed to write print data to the NVRAM 129 of the USB memory 100 by outputting the print data to the USB memory 100 in the same way as outputting the print data to the printer 1.

Since the personal computer 300 recognizes the USB memory 100 as a printer in this case, a port equivalent to an ordinary USB printer port (e.g. USB001) is generated by the plug-and-play function in cases where an OS (Operating System) like Windows XP® is used. This port generated by the plug-and-play function is exactly the same as the port that is usually generated when (not the USB memory 100 but) the printer itself is connected to the personal computer 300. Therefore, the user is allowed to perform a print operation in the same way, with no need of considering whether the device currently connected to the personal computer 300 is a printer or a USB memory.

Meanwhile, by previously setting the switch 103 at the position "storage" (S3: STORAGE), it is possible to make the personal computer 300 recognize the USB memory 100 as storage by making the USB memory 100 send back the storage class descriptor to the personal computer 300 via the connection units 101 and 316 (S5). In this case, data reading and data writing from/to the USB memory 100 (in the same way as data reading and data writing from/to an ordinary USB memory) become possible.

Further, by previously setting the switch 103 at the position "driver storage" (S3: DRIVER STORAGE), it is possible to make the personal computer 300 recognize the USB memory 100 as driver storage by making the USB memory 100 send back the storage class read-only device descriptor to the personal computer 300 via the connection units 101 and 316 (S6). In this case, the printer driver stored in the NVRAM 130 can be automatically installed in the personal computer 300 by the automatic startup of the aforementioned installer upon connection of the USB memory 100 (NVRAM 130) to the personal computer 300. Thus, even when the device to which the USB memory 100 is connected (e.g. personal computer 300) is not currently equipped with the printer driver corresponding to the descriptor stored in the printer class descriptor storage unit 121, the aforementioned writing of print data to the USB memory 100 can be carried out successfully thanks to the automatic installation of the printer driver by the installer.

On the other hand, when the received control transfer packet is not a descriptor request in the step S2 (S2: NO), the USB memory 100 judges whether the packet is a request for a printer class command or not (S7). When the packet is a printer class command request (S7: YES), the USB memory 100 sends a printer class command (as a response to the printer class command request) to the personal computer 300 (S8) and ends the process of FIG. 5. When the packet is not a printer class command request (S7: NO), the USB memory 100 executes a process corresponding to the packet (other process) (S9) and ends the process of FIG. 5.

Figure 6:
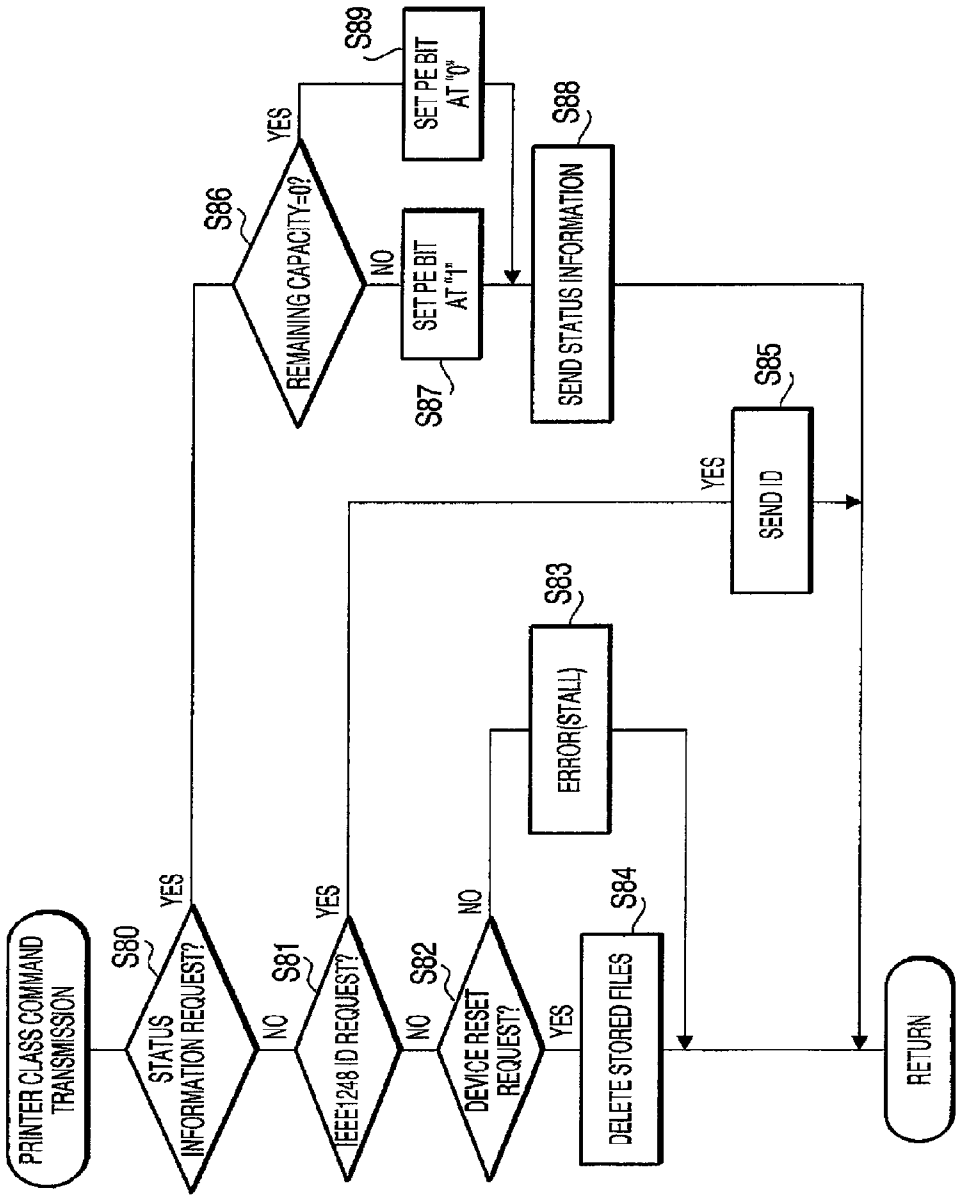
FIG. 6 is a flow chart showing a printer class command transmission process (S8 in FIG. 5)

FIG. 6 is a flow chart showing the details of the printer class command transmission process (S8 in FIG. 5). At the start of the process, the USB memory 100 judges whether the packet is a status information request or not (S80). If not a status information request (S80: NO), the USB memory 100 judges whether the packet is an IEEE 1284 ID request or not (S81). If not an IEEE 1284 ID request (S81: NO), the USB memory 100 judges whether the packet is a device reset request or not (S82).

When the packet is not a device reset request (S82: NO), an error (stall) occurs (S83) and the printer class command transmission process (and the process of FIG. 5) is ended. On the other hand, when the packet is a device reset request (S82: YES), the USB memory 100 deletes the currently processed file (print data, etc.) stored in the NVRAM 129 (S84) and ends the printer class command transmission process (and the process of FIG. 5). When the packet is an IEEE 1284 ID request in S81 (S81: YES), the USB memory 100 sends back the ID (S85) and ends the class command transmission process (and the process of FIG. 5). Incidentally, in cases where the USB memory 100 is packaged with the printer 1 as an accessory, the IEEE 1284 ID of the printer 1 has been prestored also in the USB memory 100, and thus the USB memory 100 in S85 sends back the ID of the printer 1.

When the packet is a status information request in S80 (S80: YES), the USB memory 100 judges whether the remaining memory capacity of the NVRAM 129 is 0 or not (S86). When the remaining memory capacity is 0 (S86: YES), the USE memory 100 sets a PE bit at "1" (S87) and thereafter advances to step S88. When the remaining memory capacity is not 0 (S86: NO), the USB memory 100 sets the PE bit at "0" (S87) and thereafter advances to the step S88. The PE bit is a bit representing the presence/absence of a paper error. The PE bit set at "1" indicates that a "paper empty" error has occurred. In the step S88, the USB memory 100 sends back its status information including the PE bit (S88) and ends the class command transmission process (and the process of FIG. 5).

Thus, in the case where the NVRAM 129 has no remaining memory capacity (the so-called "memory full" state) (S86: YES), the status information including the PE bit set at "1" is sent back to the personal computer 300 (S87, S88), by which a display indicating the occurrence of the paper error is made on the personal computer 300 by the printing system of the OS and the data transmission from the personal computer 300 is stopped automatically. The user viewing the display learns that the USB memory 100 (NVRAM 129) is in the "memory full" state and the storing of the print data in the USB memory 100 is incomplete. Therefore, the user can deal with the situation properly by deleting unnecessary data from the USE memory 100 and performing the print operation again, for example.

Returning to FIG. 5, when the received packet is a bulk transfer packet in the step S1 (S1: BULK), the USB memory 100 judges the status of the switch 103 similarly to the step S3 (S10). When the switch 103 is at the position "driver storage" (S10: DRIVER STORAGE), the printer driver is read out from the NVRAM 130 (S11) and the process of FIG. 5 is ended.

When the switch 103 is at the position "printer" (S10: PRINTER), a unique file name is generated by the file name generating unit 127 by a well-known method (S12) and the process advances to step S13. When the switch 103 is at the position "storage" (S10: STORAGE), the step S13 is executed without changing a file name already specified for the file system by the user. In other words, in the case where the switch 103 has been set to the position "printer" (S10: PRINTER), the contact point 113 has been connected to the file name generating unit 127 and the file name is automatically given to the file system by the file name generating unit 127. In the case where the switch 103 has been set to the position "storage" (S10: STORAGE), the contact point 113 has been connected to the file system control unit 125, and thus access to the USB memory 100 (NVRAM 129) is made by use of the file name specified by the user in the same way as access to ordinary storage. Incidentally, in the case where the switch 103 has been set to the position "driver storage" (S10: DRIVER STORAGE), the contact point 113 has been connected to the NVRAM 130 (see FIG. 3).

In the step S13, the USB memory 100 judges which of bulk in or bulk out is requested. When bulk out is requested (S13: OUT), writing to the NVRAM 129 (data storage) is carried out (S14) and the process of FIG. 5 is ended. When bulk in is requested (S13: IN), reading from the NVRAM 129 is carried out (S15) and the process of FIG. 5 is ended.

The writing (S14) and the reading (S15) are executed via the file system control unit 125. Since the print data sent from the personal computer 300 recognizing the USB memory 100 as a printer does not have a file name (S10: PRINTER), the storing of the print data in the NVRAM 129 via the file system control unit 125 (i.e. the writing of S14) is carried out after generating the file name (S12) in the process of FIG. 5. Further, since judgment on job completion is impossible in such cases where print data is written to a USB memory being recognized as a printer, the file is closed at the point when the USB memory 100 is pulled out from the personal computer 300. Thus, all jobs are recorded in one file when the printing process (i.e. writing of print data to the USB memory 100) is executed while the USB memory 100 remains connected to the personal computer 300. On the other hand, when print data is sent from the personal computer 300 recognizing the USB memory 100 as storage (S10: STORAGE), the access to the USB memory 100 is made by use of the file name specified by the user in the same way as access to ordinary storage.

Figure 7:
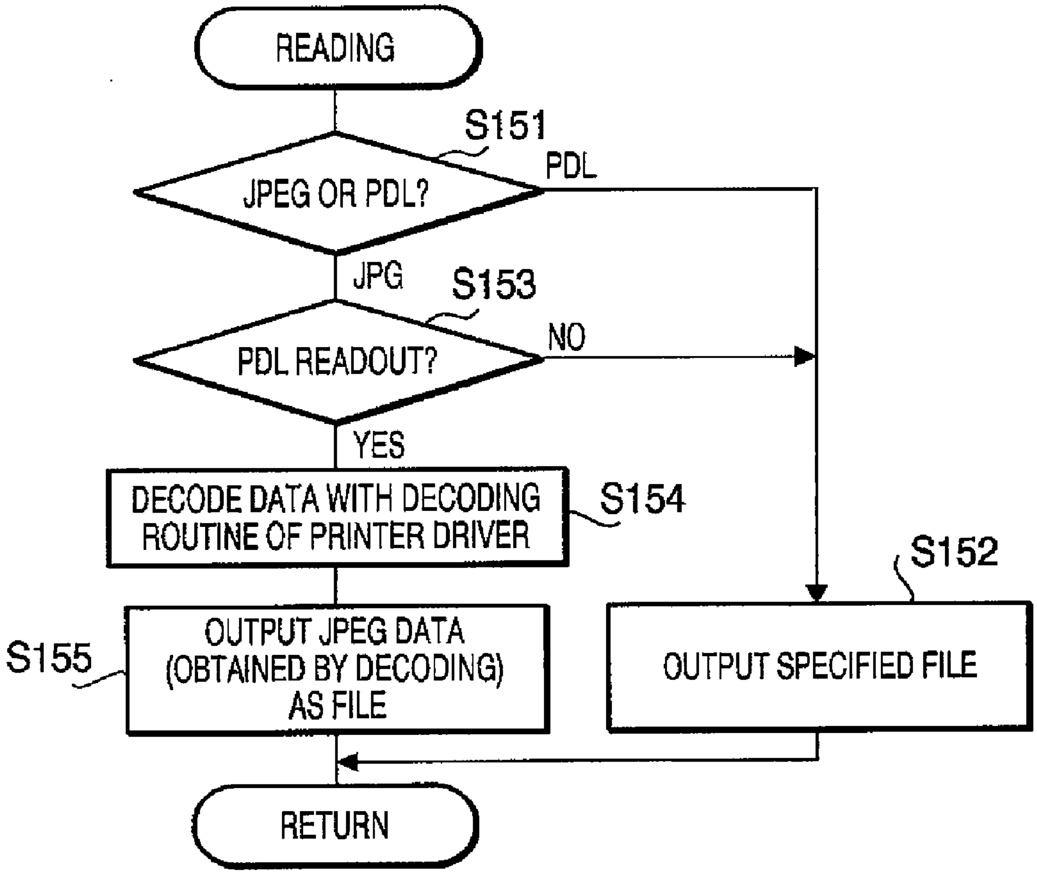
FIG. 7 is a flow chart showing the details of a reading process (S15 in FIG. 5)

In the reading process of S15, the following process is executed by the switching of the contact point 115 depending on the status of the switch 103. FIG. 7 is a flow chart showing the details of the reading process (S15 in FIG. 5). At the start of the reading process, the USB memory 100 judges the status of the switch 104 (S151). When the switch 104 is at the position "PDL" (S151: PDL), the specified file is read out from the NVRAM 129 and outputted from the USB memory 100 (S152), by which the reading process (and the process of FIG. 5) is ended. In the case where the switch 104 has been set to the position "PDL" (S151: PDL), the contact point 115 connects the file system control unit 125 directly to the contact point 113, by which the data read out from the NVRAM 129 by the file system control unit 125 is outputted from the USB memory 100 via the bulk transfer transceiver unit 109 and the USB transceiver unit 105 without being processed by the PDL-to-JPEG conversion unit 140.

On the other hand, when the switch 104 is at the position "JPEG" (S151: JPEG), the USB memory 100 judges whether the data to be read out is PDL data or not (S153). If not PDL data (S153: NO), the specified file is read out from the NVRAM 129 and outputted from the USB memory 100 by the aforementioned step S152, by which the reading process (and the process of FIG. 5) is ended. If the data to be read out is PDL data (S153: YES), the specified file (PDL data) is read out from the NVRAM 129 and decoded (converted into JPEG data) using the decoding routine of the printer driver stored in the NVRAM 130 (S154), and the JPEG data obtained by the decoding (PDL-to-JPEG conversion) is outputted as a file (S155), by which the reading process (and the process of FIG. 5) is ended.

To sum up, when the switch 104 has been set to the position "JPEG" (S151: JPEG) and the data to be read out is PDL data (S153: YES), the PDL-to-JPEG conversion is carried out by switching the contact point 115 to feed the PDL data (read out from the NVRAM 129 and outputted from the file system control unit 125) through the PDL-to-JPEG conversion unit 140. If the PDL data includes data for a document of plurality of pages, each page of the document is converted into one piece of JPEG data. Each piece of JPEG data has a filename including a serialized number. For example, the file names may be Document_Page01.jpg, Document_Page02.jpg, Document_Page03.jpg, . . . , or 00_Document.jpeg, 01_Document.jpeg, 02_Document.jpeg, . . . , or the like.

As described above, the USB memory 100 in accordance with the first embodiment is advantageous in the following points. By previously setting the switch 103 at the position "storage" (S3: STORAGE), it is possible to make the personal computer 300 recognize the USB memory 100 as storage by the returning of the storage class descriptor to the personal computer 300 (S5). In this case, the reading (S15) and writing (S14) of data can be carried out similarly to the data reading/writing from/to an ordinary USB memory.

Meanwhile, by previously setting the switch 103 at the position "printer" (S3: PRINTER), it is possible to make the personal computer 300 recognize the USB memory 100 as a printer by the returning of the printer class descriptor to the personal computer 300 (S4). In this case, the printer driver of the personal computer 300 is allowed to write print data (e.g. PDL data) to the NVRAM 129 of the USB memory 100 (S14) by outputting the print data to the USB memory 100 by bulk transfer in the same way as outputting the print data to the printer 1.

The user can let the print data (which has been written to the NVRAM 129 of the USB memory 100 as above) be automatically read out and printed out by the printer 1 in the well-known way (direct printing), by setting the switch 103 to the position "storage" and connecting the USB memory 100 to the printer 1 via the connection units 101 and 28.

When PDL data (print data) has been stored in the USB memory 100 as above, there are cases where the personal computer 300 is incapable of displaying the print image of the PDL data on the display 320 to let the user check the print image. However, the USB memory 100 of this embodiment is capable of decoding the PDL data (as print data) into JPEG data (as display data) and outputting the JPEG data to the personal computer 300 via the connection unit 101 as described above (S154, S155). Thus, data processing (data handling) by the personal computer 300 (e.g. the displaying of the print image on the display 320) can be facilitated dramatically by setting the switch 104 to the position "JPEG" previously to the connection to the personal computer 300 (S151: JPEG). When JPEG data has been stored in the USB memory 100 (S153: NO), the JPEG data is outputted by the USB memory 100 without the data conversion (S152) and the data can of course be processed (e.g. displayed) by the personal computer 300 with ease. As above, with the USB memory 100 in accordance with the first embodiment, the data sharing between the personal computer 300 and the printer 1 can be realized with ease.

<Internal Configuration of USB Memory 500 of Embodiment 2>

Figure 8:
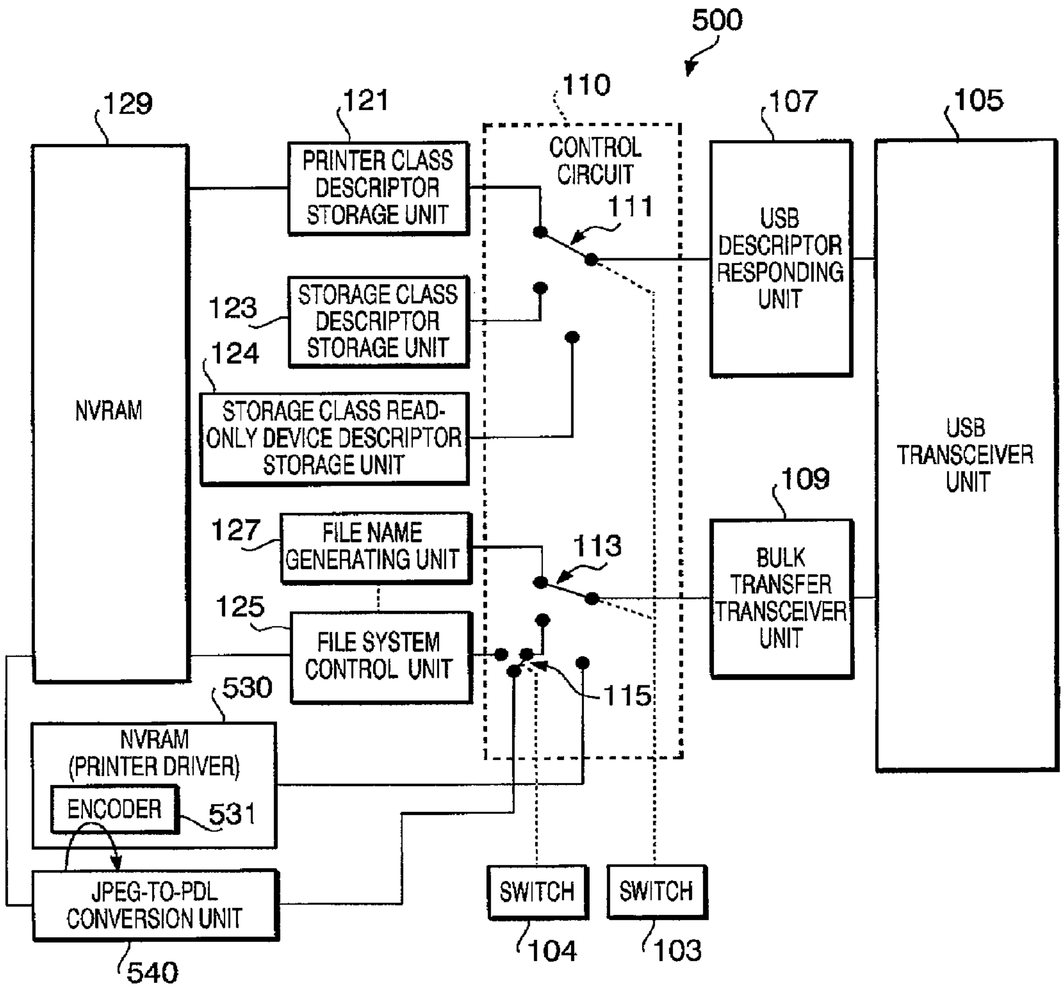
FIG. 8 is a block diagram showing a circuit configuration inside a USB memory in accordance with a second embodiment of the present invention.

FIG. 8 is a block diagram showing a circuit configuration inside a USB memory 500 in accordance with a second embodiment of the present invention. The USB Memory 500 of FIG. 8 differs from the USB memory 100 of FIG. 3 only in the following two points. First, printer driver software stored in an NVRAM 530 (replacing the aforementioned NVRAM 130) includes an encoding routine which functions as an encoder 531. Second, a JPEG-to-PDL conversion unit 540 which converts JPEG data to PDL data by calling up the encoding routine as a subroutine is employed instead of the aforementioned PDL-to-JPEG conversion unit 140. The USB Memory 500 configured as above executes the reading process in a different way as described below.

Figure 9:
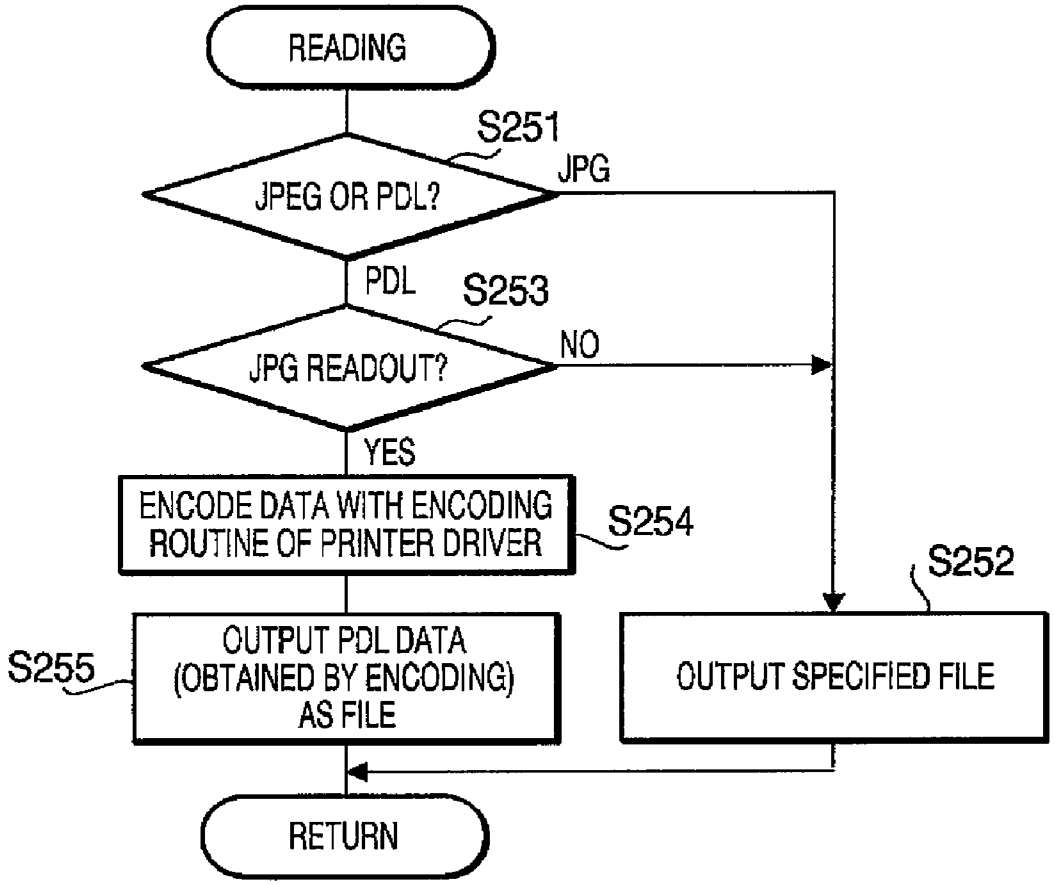
FIG. 9 is a flow chart showing the details of the reading process (S15 in FIG. 5) executed by the USB Memory of the second embodiment.

FIG. 9 is a flow chart showing the details of the reading process (S15 in FIG. 5) executed by the USB Memory 500 of the second embodiment. At the start of the reading process of FIG. 9, the USB memory 500 judges the status of the switch 104 (S251). When the switch 104 is at the position "JPEG" (S251: JPEG), the specified file is read out from the NVRAM 129 and outputted from the USB memory 500 (S252), by which the reading process (and the process of FIG. 5) is ended. In the case where the switch 104 has been set to the position "JPEG" (S251: JPEG), the contact point 115 connects the file system control unit 125 directly to the contact point 113, by which the data read out from the NVRAM 129 by the file system control unit 125 is outputted from the USB memory 500 via the bulk transfer transceiver unit 109 and the USB transceiver unit 105 without being processed by the JPEG-to-PDL conversion unit 540.

On the other hand, when the switch 104 is at the position "PDL" (S251: PDL), the USB memory 500 judges whether the data to be read out is JPEG data or not (S253). If not JPEG data (S253: NO), the specified file is read out from the NVRAM 129 and outputted from the USB memory 500 by the aforementioned step S252, by which the reading process (and the process of FIG. 5) is ended. If the data to be read out is JPEG data (S253: YES), the specified file (JPEG data) is read out from the NVRAM 129 and encoded (converted into PDL data) using the encoding routine of the printer driver stored in the NVRAM 530 (S254), and the PDL data obtained by the encoding (JPEG-to-PDL conversion) is outputted as a file (S255), by which the reading process (and the process of FIG. 5) is ended.

To sum up, when the switch 104 has been set to the position "PDL" (S251: PDL) and the data to be read out is JPEG data (S253: YES), the JPEG-to-PDL conversion is carried out by switching the contact point 115 to feed the JPEG data (read out from the NVRAM 129 and outputted from the file system control unit 125) through the JPEG-to-PDL conversion unit 540.

As described above, the USB Memory 500 in accordance with the second embodiment is capable of encoding JPEG data into PDL data (which can be printed out by the printer 1) and outputting the PDL data via the connection unit 101 (S254, S255) in cases where JPEG data has been stored therein (S253: YES). Therefore, even when JPEG data has been written to the USB Memory 500 by the personal computer 300, it is possible to make the printer 1 print out the data with ease by setting the switch 104 to the position "PDL" previously to the connection to the printer 1 (S251: PDL). When PDL data has been stored in the USB memory 500 (S253: NO), the PDL data is outputted by the USB memory 500 without the data conversion (S252) and the data can of course be printed out by the printer 1 with ease. As above, with the USB memory 500 in accordance with the second embodiment, the data sharing between the personal computer 300 and the printer 1 can be realized with ease.

<Internal Configuration of USB Memory 600 of Embodiment 3>

Figure 10:
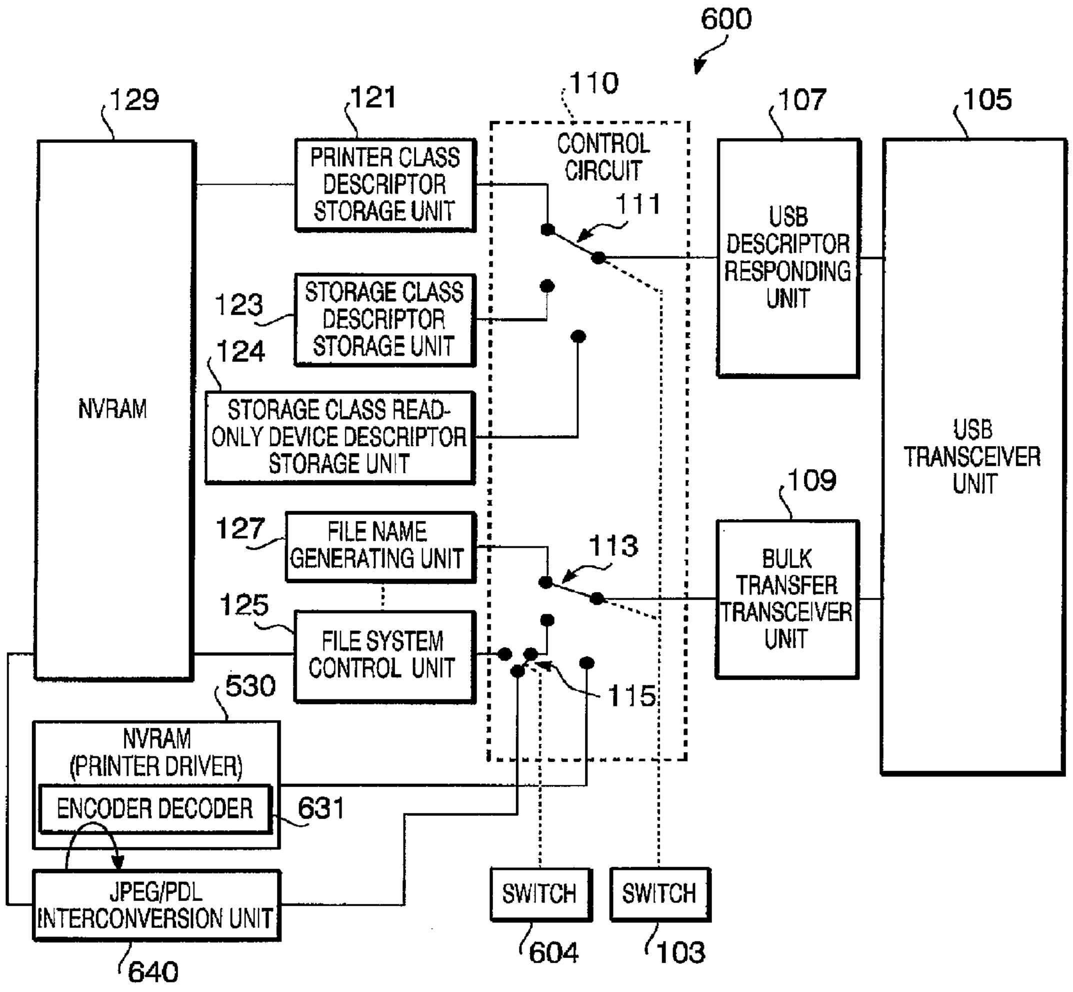
FIG. 10 is a block diagram showing a circuit configuration inside a USB memory in accordance with a third embodiment of the present invention.

FIG. 10 is a block diagram showing a circuit configuration inside a USB memory 600 in accordance with a third embodiment of the present invention. The USB Memory 600 of FIG. 10 differs from the USB memory 100 of FIG. 3 only in the following three points. First, a switch 604 (replacing the aforementioned switch 104) is configured so that it can be set to two positions "PC" and "printer". Second, printer driver software stored in an NVRAM 630 (replacing the aforementioned NVRAM 130) includes an encoding routine and a decoding routine which function as a codec (encoder/decoder) 631. Third, a JPEG/PDL interconversion unit 640 which executes interconversion between JPEG data and PDL data (i.e., a conversion in either directions: from JPEG data to PDL data, and from PDL data to JPEG data) by calling up the encoding routine or the decoding routine as a subroutine is employed instead of the aforementioned PDL-to-JPEG conversion unit 140. The USB Memory 600 configured as above executes the reading process in a different way as described below.

Figure 11:
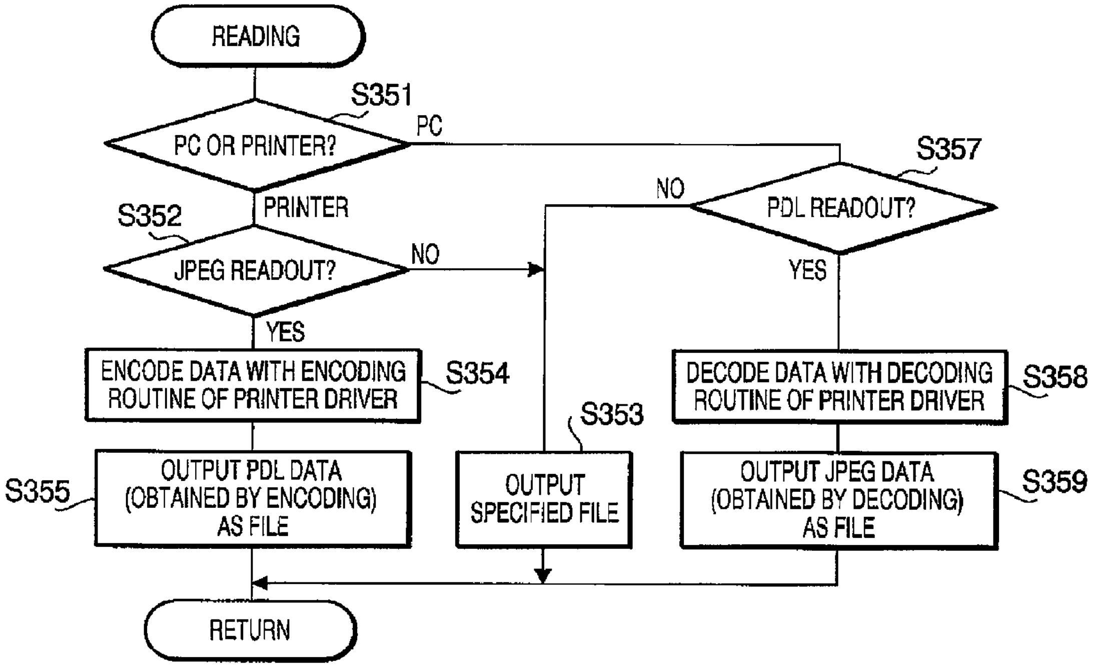
FIG. 11 is a flow chart showing the details of the reading process (S15 in FIG. 5) executed by the USB Memory of the third embodiment.

FIG. 11 is a flow chart showing the details of the reading process (S15 in FIG. 5) executed by the USB Memory 600 of the third embodiment. At the start of the reading process of FIG. 11, the USB memory 600 judges the status of the switch 604 (S351). When the switch 604 is at the position "printer" (S351: PRINTER), the USB memory 600 judges whether the data to be read out is JPEG data (JPEG file) or not (S352). If not JPEG data (S352: NO), the specified file is read out from the NVRAM 129 and outputted from the USB memory 600 (S353), by which the reading process (and the process of FIG. 5) is ended. In the case where the switch 604 has been set to the position "printer" (S351: PRINTER) and the data to be read out is not JPEG data (S352: NO), the contact point 115 connects the file system control unit 125 directly to the contact point 113, by which the data read out from the NVRAM 129 by the file system control unit 125 is outputted from the USB memory 600 via the bulk transfer transceiver unit 109 and the USB transceiver unit 105 without being processed by the JPEG/PDL interconversion unit 640.

On the other hand, if the data to be read out is JPEG data (S352: YES), the specified file (JPEG data) is read out from the NVRAM 129 and encoded (converted into PDL data) using the encoding routine of the printer driver stored in the NVRAM 630 (S354), and the PDL data obtained by the encoding (JPEG-to-PDL conversion) is outputted as a file (S355), by which the reading process (and the process of FIG. 5) is ended.

Meanwhile, when the switch 604 is at the position "PC" in S351 (S351: PC), the USB memory 600 judges whether the data to be read out is PDL data (PDL file) or not (S357). If not PDL data (S357: NO), the specified file is read out from the NVRAM 129 and outputted from the USB memory 600 by the aforementioned step S353, by which the reading process (and the process of FIG. 5) is ended. If the data to be read out is PDL data in S357 (S357: YES), the specified file (PDL data) is read out from the NVRAM 129 and decoded (converted into JPEG data) using the decoding routine of the printer driver stored in the NVRAM 630 (S358), and the JPEG data obtained by the decoding (PDL-to-JPEG conversion) is outputted as a file (S359), by which the reading process (and the process of FIG. 5) is ended.

To sum up, in the third embodiment, the contact point 115 is switched to feed the data (read out from the NVRAM 129 and outputted from the file system control unit 125) through the JPEG/PDL interconversion unit 640 when the switch 604 has been set to the position "printer" (S351: PRINTER) but the data to be read out is a JPEG file (352: YES), and when the switch 604 has been set to the position "PC" (S351: PC) but the data to be read out is a PDL file (357: YES).

As described above, the USB Memory 600 of the third embodiment outputs PDL data (print data) when the switch 604 is at the position "printer" (S351: PRINTER), irrespective of whether the data to be read out has been stored as PDL data (print data) or JPEG data (display data). When the switch 604 is at the position "PC" (S351: PC), the USB Memory 600 outputs JPEG data (display data) irrespective of whether the data to be read out has been stored as JPEG data (display data) or PDL data (print data). With the USB memory 600 in accordance with the third embodiment, the data sharing between the personal computer 300 and the printer 1 can be realized with ease and with high efficiency.

As set forth hereinabove, the portable storage medium in accordance with the present invention comprises: a connection unit which is at least connectable to either a port of a personal computer or a port of a printer; a data storage unit which stores data written to the portable storage medium via the connection unit; and a data conversion unit capable of executing at least data conversion from display data into print data or data conversion from print data into display data to the data stored in the data storage unit.

With this configuration, data conversion from display data into print data and/or data conversion from print data into display data can be executed by the data conversion unit to the data stored in the data storage unit, by which the aforementioned problems are resolved and the data sharing between a personal computer and a printer is realized with ease.

The data conversion unit may be configured to convert data stored in the data storage unit into display data if the data is print data while leaving out the data conversion if the data is display data when the data stored in the data storage unit is outputted via the connection unit.

With this configuration, display data can be outputted from the portable storage medium via the connection unit irrespective of whether the data to be outputted from the portable storage medium has been stored in the data storage unit as display data or print data. Therefore, the aforementioned problem (e.g. a personal computer incapable of displaying print data (e.g. PDL data) stored in a portable storage medium to let the user check the print image) can be resolved, for example, and data processing (data handling) by personal computers can be facilitated.

The data conversion unit may also be configured to convert data stored in the data storage unit into print data if the data is display data while leaving out the data conversion if the data is print data when the data stored in the data storage unit is outputted via the connection unit.

With this configuration, print data can be outputted from the portable storage medium via the connection unit irrespective of whether the data to be outputted from the portable storage medium has been stored in the data storage unit as print data or display data. Therefore, the aforementioned problem (e.g. a printer incapable of directly printing display data stored in a portable storage medium) can be resolved, for example, and data processing (data handling) by printers can be facilitated.

The data conversion unit may also be configured to be switchable to the following two modes: a first conversion mode for converting data stored in the data storage unit into display data if the data is print data while leaving out the data conversion if the data is display data when the data stored in the data storage unit is outputted via the connection unit; and a second conversion mode for converting data stored in the data storage unit into print data if the data is display data while leaving out the data conversion if the data is print data when the data stored in the data storage unit is outputted via the connection unit.

With this configuration, in the first conversion mode, display data is outputted from the portable storage medium via the connection unit irrespective of whether the data to be outputted from the portable storage medium has been stored in the data storage unit as display data or print data. In the second conversion mode, print data is outputted from the portable storage medium via the connection unit irrespective of whether the data to be outputted from the portable storage medium has been stored in the data storage unit as print data or display data. The conversion mode of the portable storage medium can be switched to the first conversion mode (for facilitating data processing by a personal computer by outputting display data each time) or the second conversion mode (for facilitating data processing (data printing) by a printer by outputting print data each time) as needed. Therefore, the data sharing between a personal computer and a printer can be realized with ease and with high efficiency.

Preferably, the portable storage medium further comprises: a switch which can be set to a position specifying "storage" and a position specifying "printer"; a storage class descriptor storage unit which stores a storage class descriptor; a printer class descriptor storage unit which stores a printer class descriptor; and a descriptor responding unit which receives a descriptor request sent from a device connected to the portable storage medium and sends back the storage class descriptor to the device when the switch is at the position specifying "storage" while sending back the printer class descriptor to the device when the switch is at the position specifying "printer".

With this configuration, by previously setting the switch at the position specifying "printer", it is possible to make the device sending the descriptor request (e.g. personal computer) recognize the portable storage medium as a printer by the returning of the printer class descriptor. In this case, a printer driver installed in the device (e.g. personal computer) is allowed to write print data (e.g. PDL data) to the portable storage medium by outputting the print data to the portable storage medium in the same way as outputting the print data to a printer. Meanwhile, by previously setting the switch at the position specifying "storage", it is possible to make the device sending the descriptor request (e.g. personal computer) recognize the portable storage medium as storage by the returning of the storage class descriptor. In this case, data reading and data writing from/to the portable storage medium (in the same way as data reading and data writing from/to an ordinary storage medium) become possible.

Preferably, the portable storage medium further comprises: a storage class read-only device descriptor storage unit which stores a storage class read-only device descriptor; and a printer driver installer storage unit which stores a printer driver corresponding to the printer class descriptor stored in the printer class descriptor storage unit and an installer for installation of the printer driver. The switch is configured so that it can be set also to a position specifying "driver storage". The descriptor responding unit sends back the storage class read-only device descriptor to the device connected to the portable storage medium upon reception of the descriptor request when the switch is at the position specifying "driver storage". The installer is configured to be capable of automatically installing the printer driver in the device connected to the portable storage medium when the switch is at the position specifying "driver storage".

With this configuration, by previously setting the switch at the position specifying "driver storage", it is possible to make the device sending the descriptor request (e.g. personal computer) recognize the portable storage medium as driver storage by the returning of the storage class read-only device descriptor. In this case, the printer driver stored in the printer driver installer storage unit can be automatically installed in the device (e.g. personal computer) upon connection of the portable storage medium to the device. Thus, even when the device is not currently equipped with the printer driver corresponding to the descriptor stored in the printer class descriptor storage unit, the aforementioned writing of print data to the portable storage medium can be carried out successfully thanks to the automatic installation of the printer driver by the installer.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, in the second and third embodiments, the printer class descriptor storage unit 121 and the switch 103 may also be left out since the USB memory 500, 600 (capable of converting JPEG data stored in the NVRAM 129 into PDL data and outputting the data as a PDL file in cases of direct printing) does not need to make the personal computer 300 recognize the USB memory as a printer.

While the USB memories 100, 500 and 600 have been described in the above embodiments, the present invention is applicable not only to USB memories but also to various other portable storage media (memory card, portable HDD (Hard Disk Drive), etc.).

Incidentally, both the encoder and the decoder (used by the PDL-to-JPEG conversion unit 140, the JPEG-to-PDL conversion unit 540 and the JPEG/PDL interconversion unit 640) in the above embodiments have been configured as internal routines of the printer driver. With this configuration, misuse of an encoder or decoder incompatible with the printer driver can be prevented since modification/update of the printer driver is necessarily accompanied by corresponding modification/update of the encoder and the decoder. However, the present invention is not restricted to this configuration; the encoder and the decoder may also be configured as separate files, etc.

While JPEG data and PDL data have been used in the above embodiments as examples of display data and print data read and written from/to the portable storage medium, the present invention is applicable also to cases where display data and print data of other data formats are used.

What is claimed is:

1. A portable storage medium comprising:

a connection unit which is connectable to an external device and enables data communication between the portable storage medium and the external device connected to the connection unit;

a data storage unit which stores data received from the external device via the connection unit; and a data conversion unit configured to apply data conversion from print data into display data to the data stored in the data storage unit a switch which is configured to be set to a position specifying "storage" and a position specifying "printer";

a storage class descriptor storage unit which stores a storage class descriptor;

a printer class descriptor storage unit which stores a printer class descriptor; and a descriptor responding unit which receives a descriptor request sent from the external device connected to the connection unit and sends back a descriptor to the external device, wherein the descriptor responding unit sends back the storage class descriptor to the external device in response to a descriptor request sent from a external device when the switch is at the position specifying "storage", wherein the descriptor responding unit sends back the printer class descriptor to the external device in response to a descriptor request sent from a external device when the switch is at the position specifying "printer";

a storage class read-only device descriptor storage unit which stores a storage class read-only device descriptor; and a printer driver installer storage unit which stores a printer driver corresponding to the printer class descriptor stored in the printer class descriptor storage unit and an installer for installation of the printer driver wherein:

the switch is configured to be set to a position specifying "driver storage", and the descriptor responding unit sends back the storage class read-only device descriptor to the external device connected to the portable storage medium in response to the descriptor request from the external device when the switch is at the position specifying "driver storage", and the installer is configured to automatically install the printer driver in the external device connected to the connection unit when the switch is at the position specifying "driver storage".

2. The portable storage medium according to claim 1, wherein the data conversion unit converts data stored in the data storage unit into display data if the data is print data, and wherein the connection unit transfers the display data converted from data stored in the data storage unit to the external device.

3. The portable storage medium according to claim 1, further comprising a switch which is configured to be set to a first state and a second state, wherein when the switch is in the first state, the data conversion unit converts data stored in the data storage unit into display data if the data is print data, and the connection unit transfers the display data converted from data stored in the data storage unit to the external device; and wherein when the switch is in the second state, the connection unit transfers the data stored in the data storage unit to the external device.

4. A portable storage medium comprising:

a connection unit which is connectable to an external device and enables data communication between the portable storage medium and the external device connected to the connection unit;

a data storage unit which stores data received from the external device via the connection unit;

a data conversion unit configured to apply data conversion from display data into print data to the data stored in the data storage unit;

a switch which is configured to be set to a position specifying "storage" and a position specifying "printer";

a storage class descriptor storage unit which stores a storage class descriptor;

a printer class descriptor storage unit which stores a printer class descriptor; and a descriptor responding unit which receives a descriptor request sent from the external device connected to the connection unit and sends back a descriptor to the external device, wherein the descriptor responding unit sends back the storage class descriptor to the external device in response to a descriptor request sent from a external device when the switch is at the position specifying "storage", wherein the descriptor responding unit sends back the printer class descriptor to the external device in response to a descriptor request sent from a external device when the switch is at the position specifying "printer";

a storage class read-only device descriptor storage unit which stores a storage class read-only device descriptor; and a printer driver installer storage unit which stores a printer driver corresponding to the printer class descriptor stored in the printer class descriptor storage unit and an installer for installation of the printer driver wherein:

the switch is configured to be set to a position specifying "driver storage", and the descriptor responding unit sends back the storage class read-only device descriptor to the external device connected to the portable storage medium in response to the descriptor request from the external device when the switch is at the position specifying "driver storage", and the installer is configured to automatically install the printer driver in the external device connected to the connection unit when the switch is at the position specifying "driver storage".

5. The portable storage medium according to claim 4, wherein the data conversion unit converts data stored in the data storage unit into print data if the data is display data, and wherein the connection unit transfers the print data converted from data stored in the data storage unit to the external device.

6. The portable storage medium according to claim 4, further comprising a switch which is configured to be set to a first state and a second state, wherein when the switch is in the first state, the data conversion unit converts data stored in the data storage unit into print data if the data is display data, and the connection unit transfers the print data converted from data stored in the data storage unit to the external device; and wherein when the switch is in the second state, the connection unit transfers the data stored in the data storage unit to the external device.

7. A portable storage medium comprising:

a connection unit which is connectable to external device and enables data communication between the portable storage medium and the external device connected to the connection unit;

a data storage unit which stores data received from the external device via the connection unit;

a data conversion configured to apply data conversion from display data into print data and data conversion from print data into display data to the data stored in the data storage unit, a switch which is configured to be set to a position specifying "storage" and a position specifying "printer";

a storage class descriptor storage unit which stores a storage class descriptor;

a printer class descriptor storage unit which stores a printer class descriptor; and a descriptor responding unit which receives a descriptor request sent from the external device connected to the connection unit and sends back a descriptor to the external device, wherein the descriptor responding unit sends back the storage class descriptor to the external device in response to a descriptor request sent from a external device when the switch is at the position specifying "storage", wherein the descriptor responding unit sends back the printer class descriptor to the external device in response to a descriptor request sent from a external device when the switch is at the position specifying "printer";

a storage class read-only device descriptor storage unit which stores a storage class read-only device descriptor; and a printer driver installer storage unit which stores a printer driver corresponding to the printer class descriptor stored in the printer class descriptor storage unit and an installer for installation of the printer driver wherein:

the switch is configured to be set to a position specifying "driver storage", and the descriptor responding unit sends back the storage class read-only device descriptor to the external device connected to the portable storage medium in response to the descriptor request from the external device when the switch is at the position specifying "driver storage", and the installer is configured to automatically install the printer driver in the external device connected to the connection unit when the switch is at the position specifying "driver storage".

8. The portable storage medium according to claim 7, wherein the data conversion unit converts data stored in the data storage unit into display data if the data is print data, and wherein the connection unit transfers the display data converted from data stored in the data storage unit to the external device.

9. The portable storage medium according to claim 7, wherein the data conversion unit converts data stored in the data storage unit into print data if the data is display data, and wherein the connection unit transfers the print data converted from data stored in the data storage unit to the external device.

10. The portable storage medium according to claim 7, wherein the data conversion unit is configured such that an operation mode can be switchable between following two modes:

a first conversion mode for converting data stored in the data storage unit into display data if the data is print data; and a second conversion mode for converting data stored in the data storage unit into print data if the data is display data.

11. A portable storage medium comprising:

a connection unit which is connectable to external device and enables data communication between the portable storage medium and the external device connected to the connection unit;

a data storage unit which stores data received from the external device via the connection unit;

a data conversion unit configured to apply data conversion from display data into print data and data conversion from print data into display data to the data stored in the data storage unit;

a switch which is configured to be set to a position specifying "storage" and a position specifying "printer";

a storage class descriptor storage unit which stores a storage class descriptor;

a printer class descriptor storage unit which stores a printer class descriptor; and a descriptor responding unit which receives a descriptor request sent from the external device connected to the connection unit and sends back a descriptor to the external device, wherein the descriptor responding unit sends back the storage class descriptor to the external device in response to a descriptor request sent from a external device when the switch is at the position specifying "storage", and wherein the descriptor responding unit sends back the printer class descriptor to the external device in response to a descriptor request sent from a external device when the switch is at the position specifying "printer".

* * * * *

UNITED STATES PATENT AND TRADEMARK OFFICE

CERTIFICATE OF CORRECTION

PATENT NO. : 7,827,332 B2
APPLICATION NO. : 12/058111
DATED : November 2, 2010
INVENTOR(S) : Masatoshi Kadota It is certified that error appears in the above-identified patent and that said Letters Patent is hereby corrected as shown below:

Column 14, Claim 1, Line 61:

Please delete “unit a switch which is configured to be a position specifying “storage” and a position specifying “printer”;”

and insert --unit;

a switch which is configured to be a position specifying “storage” and a position specifying “printer”--

Signed and Sealed this
Twenty-sixth Day of July, 2011

David J. Kappos
*Director of the United States Patent and Trademark Office*